United States Patent
Fujiyama et al.

(10) Patent No.: US 9,811,961 B2
(45) Date of Patent: Nov. 7, 2017

(54) VEHICULAR NEAR FIELD COMMUNICATION SYSTEM, PORTABLE DEVICE, AND ON-BOARD INSTRUMENT

(71) Applicant: Panasonic Intellectual Property Management Co., Ltd., Osaka (JP)

(72) Inventors: Jun Fujiyama, Kanagawa (JP); Masami Takigawa, Kanagawa (JP); Naoki Hayashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/256,736

(22) Filed: Sep. 6, 2016

(65) Prior Publication Data

US 2016/0371906 A1    Dec. 22, 2016

Related U.S. Application Data

(63) Continuation of application No. PCT/JP2014/004969, filed on Sep. 29, 2014.

(30) Foreign Application Priority Data

Mar. 24, 2014 (JP) .................. 2014-059893

(51) Int. Cl.
*G05B 19/00* (2006.01)
*G07C 9/00* (2006.01)
(Continued)

(52) U.S. Cl.
CPC .......... *G07C 9/00309* (2013.01); *B60R 25/10* (2013.01); *B60R 25/245* (2013.01);
(Continued)

(58) Field of Classification Search
CPC .................. B60R 25/10; B60R 25/245; G07C 2009/00769; G07C 2209/63; G07C 9/00309; H04B 5/0056
(Continued)

(56) References Cited

U.S. PATENT DOCUMENTS

2003/0193388 A1* 10/2003 Ghabra ................... B60R 25/24
340/5.61
2005/0258936 A1* 11/2005 Ghabra ................. B60R 25/245
340/5.72
(Continued)

FOREIGN PATENT DOCUMENTS

JP    2000-261245    9/2000
JP    2007-146396    6/2007
(Continued)

OTHER PUBLICATIONS

International Search Report of PCT application No. PCT/JP2014/004969 dated Dec. 9, 2014.

*Primary Examiner* — Ojiako Nwugo
(74) *Attorney, Agent, or Firm* — Pearne & Gordon LLP

(57) ABSTRACT

This vehicular near field communication system has a configuration where a portable device receives a first signal and a second signal respectively transmitted from a vehicle-exterior antenna and a vehicle-interior antenna of an on-board instrument mounted in a vehicle, measures a first received signal strength from the first signal, measures a second received signal strength from the second signal, adds an offset to the second received signal strength, and transmits a response signal to the on-board instrument in accordance with the first received signal strength and the second received signal strength added with the offset, so as to be able to prevent a portable device from being locked in a cabin even though the portable device is shielded by a metal in the cabin.

8 Claims, 12 Drawing Sheets

(51) Int. Cl.
  *B60R 25/10*     (2013.01)
  *B60R 25/24*     (2013.01)
  *H04B 5/00*      (2006.01)

(52) U.S. Cl.
  CPC .............. *G07C 2009/00769* (2013.01); *G07C 2209/63* (2013.01); *H04B 5/0056* (2013.01)

(58) Field of Classification Search
  USPC .......................................... 340/5.61, 426.36
  See application file for complete search history.

(56)       References Cited

U.S. PATENT DOCUMENTS

2007/0109093  A1      5/2007  Matsubara et al.
  2007/0162191  A1      7/2007  Matsubara et al.
  2008/0258553  A1*    10/2008  Christenson ............ B60R 25/24
                                                        307/10.2
  2011/0309922  A1*    12/2011  Ghabra ................... B60R 25/24
                                                        340/426.36
  2013/0176107  A1*     7/2013  Dumas ............... G07C 9/00571
                                                        340/5.61
  2014/0077929  A1*     3/2014  Dumas ............... G07C 9/00571
                                                        340/5.61

FOREIGN PATENT DOCUMENTS

JP       2010-180670       8/2010
  JP       2011-020556       2/2011
  JP       2011-144625       7/2011
  JP       2013-100672       5/2013
  JP       2014-046712       3/2014

* cited by examiner

VEHICULAR NEAR FIELD COMMUNICATION SYSTEM, PORTABLE DEVICE, AND ON-BOARD INSTRUMENT

TECHNICAL FIELD

The present disclosure relates to a portable device held by a user, an on-board instrument mounted in a vehicle, and a vehicular near field communication system performing near field communications between the portable device and the on-board instrument.

BACKGROUND ART

As a method for locking and unlocking doors of a vehicle, a smart entry method, an advanced style of a keyless entry method, has become used in recent years. In a keyless entry method, doors of a vehicle are locked or unlocked when a user presses a button provided on a key. The user is required to take up the key from a bag or a pocket to use the key.

On the other hand, a smart entry method has a function for performing near field communications between a vehicle and a key (hereinafter referred to as "smart key") to lock or unlock doors of the vehicle through radio communications between the vehicle and the smart key. Specifically, with the smart key being held in a bag or a pocket, a user can unlock the doors of the vehicle, when the doors are locked, by only touching a touch sensor or a request switch of the vehicle, as well as can lock the doors of the vehicle, when the doors are unlocked, by only touching the touch sensor. In addition, in the smart entry method, when the smart key is detected in the vehicle, an engine can be started without inserting the key into a keyhole of the vehicle. Accordingly, it is necessary that the smart key be precisely detected whether the smart key is present inside or outside the vehicle.

The smart entry method uses radio waves, thus, if the smart key is shielded by a metallic object in a cabin, for example, the smart key could unintentionally be locked in the cabin.

As a technology for preventing a smart key from being locked in a vehicle, a technology disclosed in Patent Literature 1 is known, for example. Patent Literature 1 discloses a vehicular controller that prevents a vehicle from being remotely controlled when the vehicular controller is switched from a detection mode in which positional information of a portable device can be detected in a cabin to a non-detection mode in which positional information of the portable device cannot be detected. According to this vehicular controller, even if a radio wave between the vehicle and the portable device is interrupted due to a dead battery of the portable device while the portable device is present in the cabin, a user can prevent the portable device from being locked in the cabin.

CITATION LIST

Patent Literature

PTL 1: Unexamined Japanese Patent Publication No. 2007-146396

SUMMARY OF THE INVENTION

The vehicular controller disclosed in Patent Literature 1 is limited to a case in which a radio wave between the vehicle and the portable device is interrupted, thus, is not applicable when the smart key is shielded by a metallic object in the cabin. That is, in such a case, even when the smart key is present in the cabin, the vehicle and the smart key can communicate although a radio wave is weak, thus the vehicular controller detects that the smart key is present outside the cabin. As a result, the smart key could be locked in the cabin.

An object of the present disclosure is to provide a vehicular near field communication system, a portable device, and an on-board instrument for preventing a smart key from being locked in a cabin even if the smart key is shield by a metallic object in the cabin.

A vehicular near field communication system according to an aspect of the present disclosure is a vehicular near field communication system including an on-board instrument having a vehicle-exterior antenna and a vehicle-interior antenna, the on-board instrument being mounted in a vehicle, and a portable device performing radio communications with the on-board instrument. The portable device includes a receiver for receiving a first signal transmitted from the vehicle-exterior antenna and a second signal transmitted from the vehicle-interior antenna, a measure for measuring a first received signal strength from the first signal and a second received signal strength from the second signal, an offset adder for adding an offset to the second received signal strength, and a transmitter for transmitting a response signal to the on-board instrument in accordance with the first received signal strength and the second received signal strength added with the offset.

A portable device according to an aspect of the present disclosure includes a receiver for receiving a first signal and a second signal transmitted respectively from a vehicle-exterior antenna and a vehicle-interior antenna included in an on-board instrument mounted in a vehicle, a measure for measuring a first received signal strength from the first signal and a second received signal strength from the second signal, an offset adder for adding an offset to the second received signal strength, and a transmitter for transmitting a response signal to the on-board instrument in accordance with the first received signal strength and the second received signal strength added with the offset.

An on-board instrument according to an aspect of the present disclosure includes a vehicle-exterior antenna, a vehicle-interior antenna, a transmitter for transmitting to a portable device a first signal and a second signal respectively from the vehicle-exterior antenna and the vehicle-interior antenna, a receiver for receiving from the portable device a first received signal strength of the first signal and a second received signal strength of the second signal each measured by the portable device, an offset adder for adding an offset to the second received signal strength, and a detector for detecting a position of the portable device based on the first received signal strength and the second received signal strength added with the offset.

According to the present disclosure, a user can prevent the smart key from being locked in a cabin even if the smart key is shield by a metallic object in the cabin.

DESCRIPTION OF EMBODIMENTS

Exemplary embodiments of the present disclosure will now be described in detail with reference to the drawings.

First Exemplary Embodiment

Figure 1:
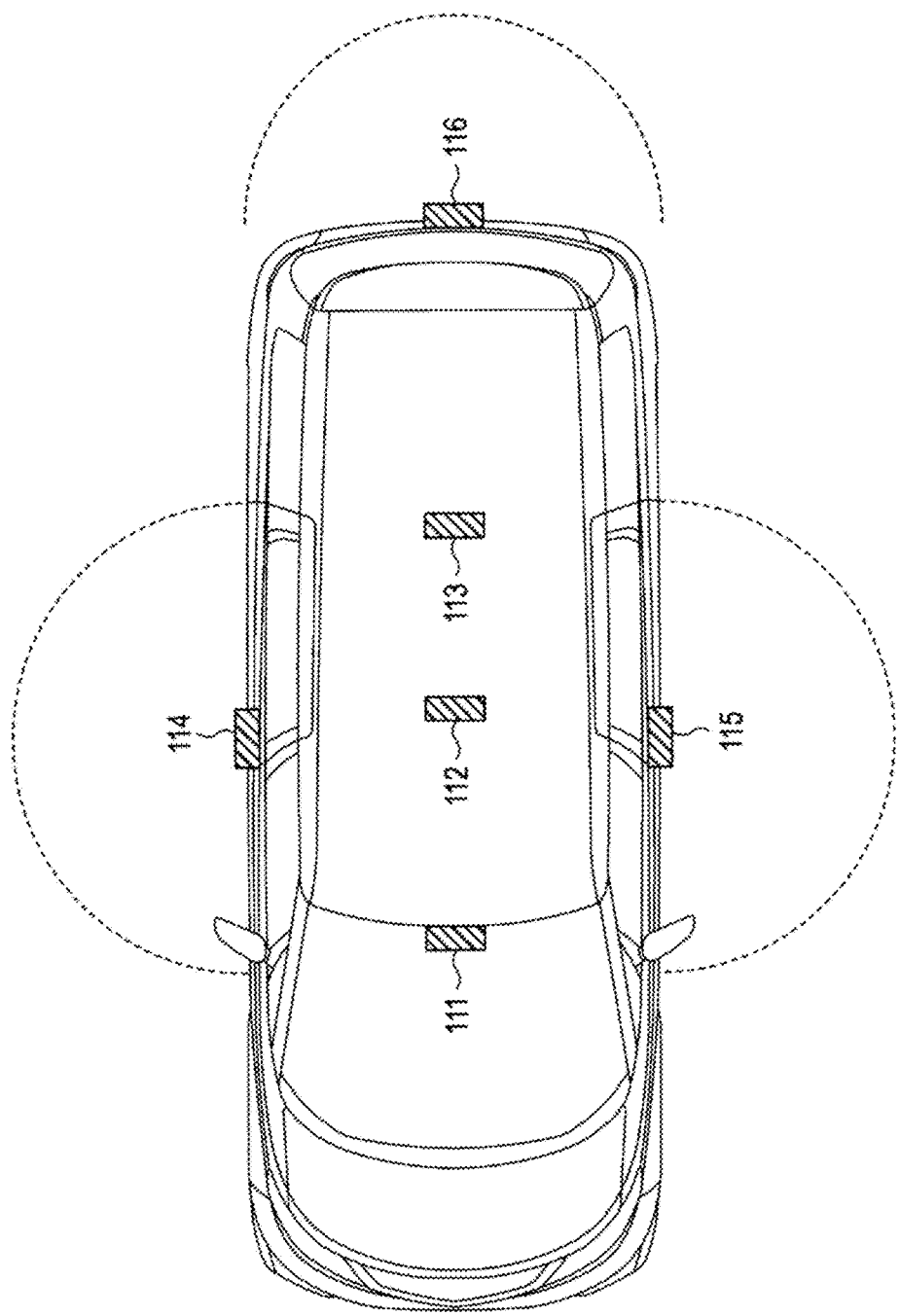
FIG. 1 is a view illustrating positions of smart entry antennas disposed in a vehicle.

FIG. 1 is a view illustrating positions of smart entry antennas disposed in a vehicle. In FIG. 1, three vehicle-interior antennas, i.e. front vehicle-interior antenna (hereinafter referred to as "front antenna") 111, center vehicle-interior antenna (hereinafter referred to as "mid-antenna") 112, and rear vehicle-interior antenna (hereinafter referred to as "rear antenna") 113, are disposed in an interior of the vehicle.

In addition, three vehicle-exterior antennas, i.e. vehicle-exterior, driver's seat side door handle antenna (hereinafter referred to as "driver's seat antenna") 114, vehicle-exterior, front passenger's seat side door handle antenna (hereinafter referred to as "front passenger's seat antenna") 115, and vehicle-exterior, tail gate/trunk side antenna (hereinafter referred to as "tail gate antenna") 116, are disposed on an exterior of the vehicle.

Figure 2:
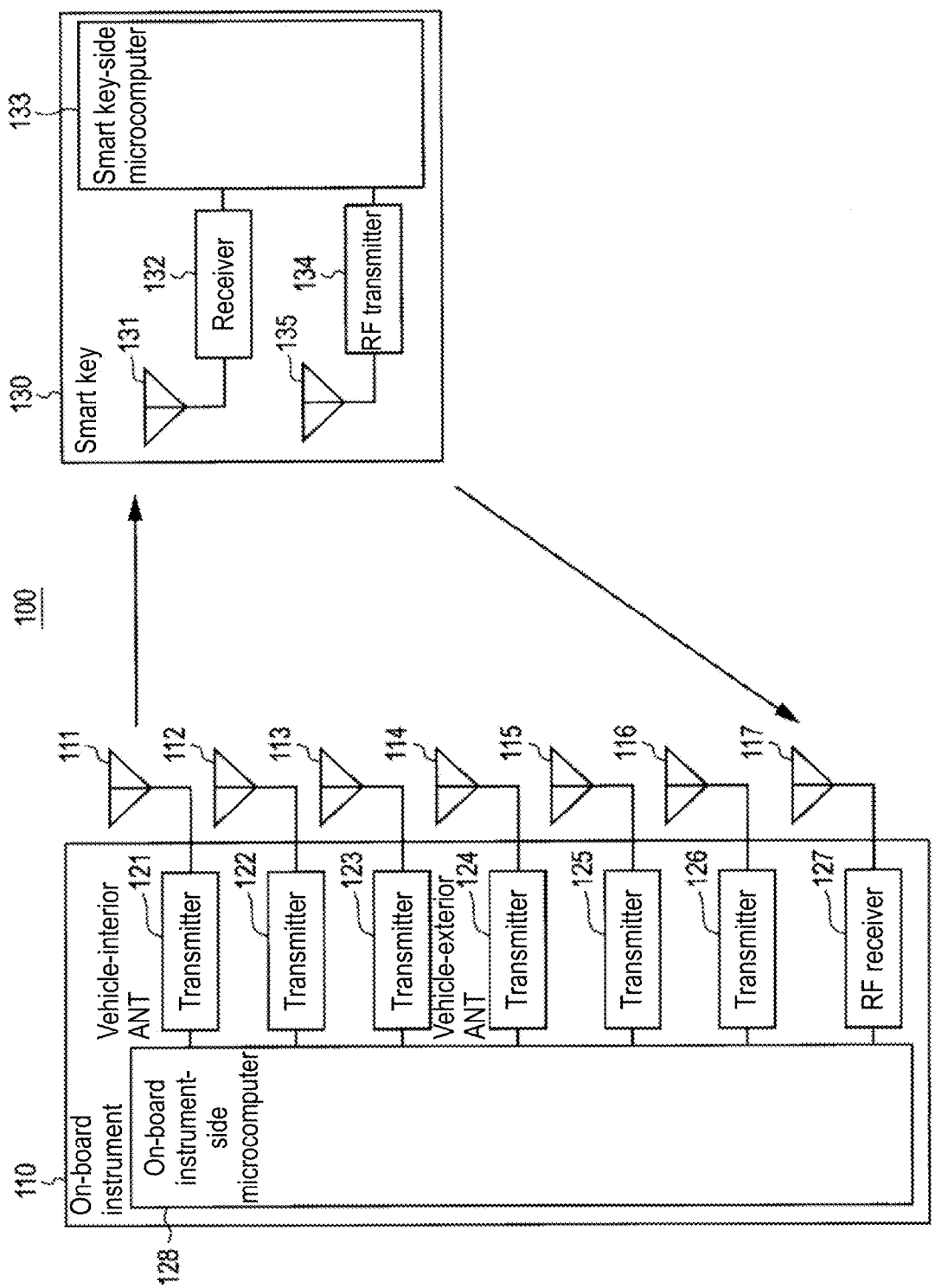
FIG. 2 is a view illustrating a schematic configuration of a smart entry system according to a first exemplary embodiment of the present disclosure.

FIG. 2 is a view illustrating a schematic configuration of smart entry system 100 that is a vehicular near field communication system according to the first exemplary embodiment of the present invention. Smart entry system 100 includes, on-board instrument 110 disposed in a vehicle and smart key 130 that is a portable device held by a user or another person.

On-board instrument 110 includes a plurality of transmitting antennas 111 to 116, transmitters 121 to 126, RF receiving antenna 117, RF receiver 127, and on-board instrument-side microcomputer (that is also referred to as antenna control unit) 128.

The plurality of transmitting antennas 111 to 116 includes, front antenna 111, mid-antenna 112, and rear antenna 113 each disposed in an interior of the vehicle, and driver's seat antenna 114, front passenger's seat antenna 115, and tail gate antenna 116 each disposed on an exterior of the vehicle.

Transmitters 121 to 126 are respectively coupled to the plurality of transmitting antennas 111 to 116, apply a transmission process, such as modulation and amplification, to a signal output from on-board instrument-side microcomputer 128, and transmit from one or any of the transmitting antennas the signal to which the transmission process is applied.

RF receiving antenna 117 receives a radio frequency (RF) signal transmitted from smart key 130, and RF receiver 127 applies a reception process, such as demodulation, to the signal received by RF receiving antenna 117, and outputs to on-board instrument-side microcomputer 128 the signal to which the reception process is applied.

On-board instrument-side microcomputer 128 controls which of the plurality of transmitting antennas 111 to 116 should be used, and checks if smart key 130 is detected to control locking and unlocking of doors of the vehicle, and permits an engine to start.

On the other hand, smart key 130 includes receiving antenna 131, receiver 132, smart key-side microcomputer 133, RF transmitter 134, and RF transmitting antenna 135.

Receiving antenna 131 receives a signal transmitted from each of antennas 111 to 116 of on-board instrument 110, and receiver 132 applies a reception process, such as demodulation, to the signal received by receiving antenna 131, and outputs to smart key-side microcomputer 133 the signal to which the reception process is applied.

Smart key-side microcomputer 133 is a measuring means for measuring a received signal strength indicator (RSSI, or received signal strength) from a signal output from receiver 132, as well as is a determining means for making a determination. In addition, smart key-side microcomputer 133 has a rewritable memory, and stores an offset to be added to the RSSI in the memory. Smart key-side microcomputer 133 outputs an RF response (response signal) to RF transmitter 134 in accordance with a measurement result and the offset. Detailed operations of smart key-side microcomputer 133 will be described later.

RF transmitter 134 applies a transmission process, such as modulation and amplification, to an RF response output from smart key-side microcomputer 133, and transmits the RF response to which the transmission process is applied, from RF transmitting antenna 135 to on-board instrument 110.

Figure 3:
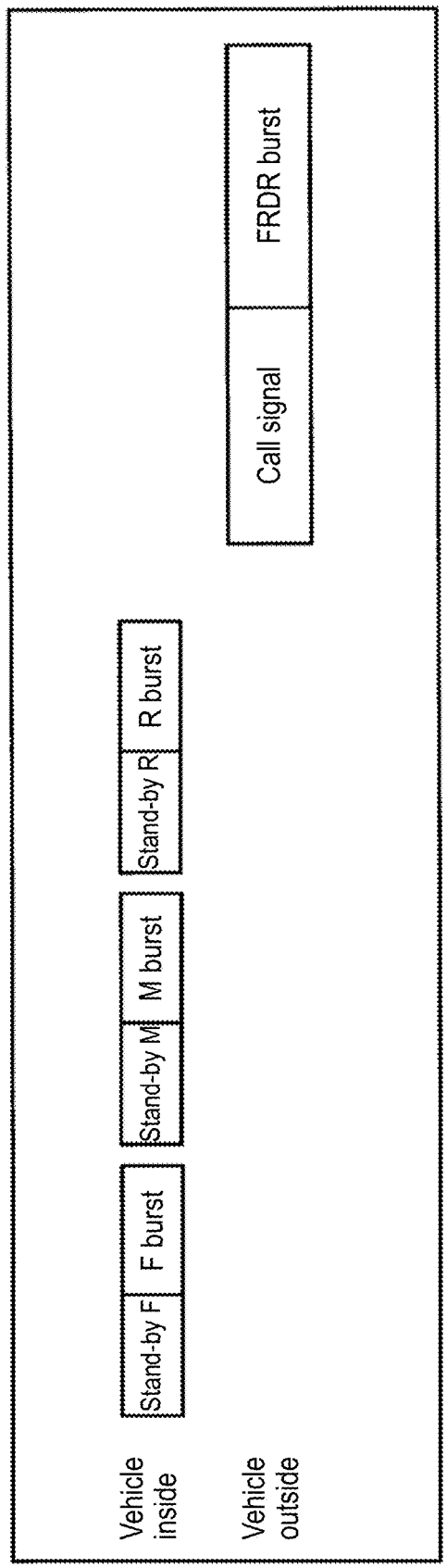
FIG. 3 is a view illustrating signals to be transmitted from a driver's seat antenna and each antenna in the vehicle, and timings of the signals.

FIG. 3 is a view illustrating signals to be transmitted from each antenna by on-board instrument-side microcomputer 128 shown in FIG. 2, and timings of the signals. On-board instrument-side microcomputer 128 transmits a call signal and a driver's seat burst (first signal) from driver's seat antenna 114, and then sequentially transmits a stand-by instruction signal and each antenna burst (second signal) from each of the antennas, i.e. front antenna 111, mid-antenna 112, and rear antenna 113. A burst used herein is referred to as a radio signal to be transmitted by a device on a transmission side in order to measure a strength of a signal received by a device on a reception side.

Figure 4:
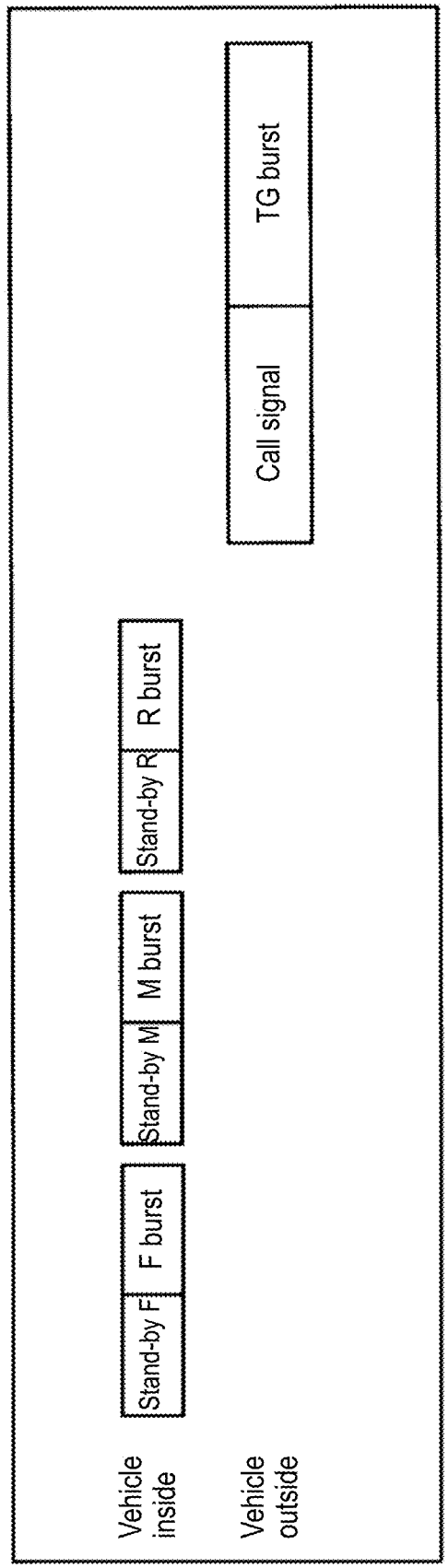
FIG. 4 is a view illustrating signals to be transmitted from a tail gate/trunk antenna and each antenna in the vehicle, and timings of the signals.
Figure 5:
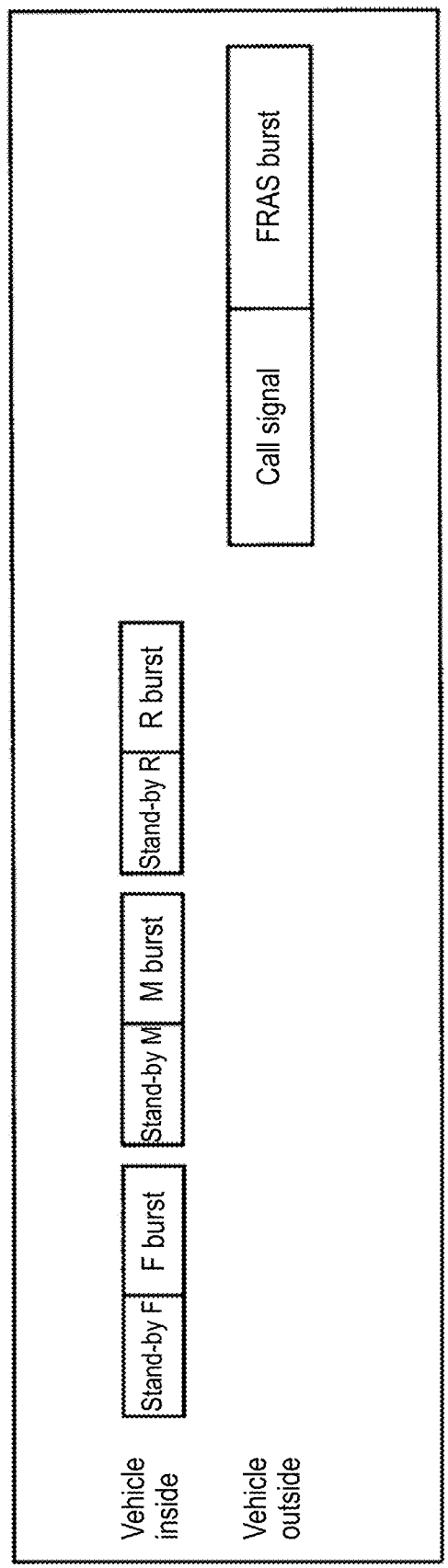
FIG. 5 is a view illustrating signals to be transmitted from a front passenger's seat antenna and each antenna in the vehicle, and timings of the signals.

Although FIG. 3 only shows a case where driver's seat antenna 114 begins transmission of a call signal and a driver's seat burst, after that, as shown in FIG. 4, tail gate antenna 116 transmits a call signal and a tail gate burst (first signal), and each of the antennas 111 to 113 in the interior of the vehicle transmits an antenna burst (second signal). In addition, after that, as shown in FIG. 5, front passenger's seat antenna 115 transmits a call signal and a front passenger's seat burst (first signal), and each of the antennas 111 to 113 in the interior of the vehicle transmits an antenna burst (second signal).

On-board instrument-side microcomputer 128 construes the closing of the door as a trigger to begin transmission of a call signal and a burst from an antenna disposed on the door. The above description is a case where a door on a driver's seat side is finally closed, in an order of FIGS. 3, 4, and 5. In addition, no burst may be transmitted from another vehicle-exterior antenna upon smart key 130 is detected.

In FIG. 3, the call signal includes a signal for waking up smart key 130 being in a sleep mode, and an ID or the like for authenticating a pair of on-board instrument 110 and smart key 130. A sleep mode used herein is referred to as a state where a smart key wakes up when a call signal is received. In addition, a front antenna burst (front burst) is a series of signals used by smart key 130 to measure an RSSI (received signal strength) received from front antenna 111. In addition, a stand-by instruction signal instructs the smart key to stay in a stand-by mode in which a call signal is ignored even if the call signal is received.

Smart key 130 that has received such a signal measures an RSSI from each burst, and compares a value in which an offset is added to a vehicle-interior antenna RSSI (second received signal strength) with a vehicle-exterior antenna RSSI (first received signal strength). As a result of this comparison, when the value in which the offset is added to the vehicle-interior antenna RSSI is below the vehicle-exterior antenna RSSI, smart key 130 returns to on-board instrument 110 an RF response (response signal) indicating that the value is below the RSSI. In addition, when all of a front antenna RSSI, a mid-antenna RSSI, and a rear antenna RSSI are below a predetermined auto-lock threshold, smart key 130 returns to on-board instrument 110 an RF response (response signal) indicating that the RSSIs are below the threshold.

Figure 6:
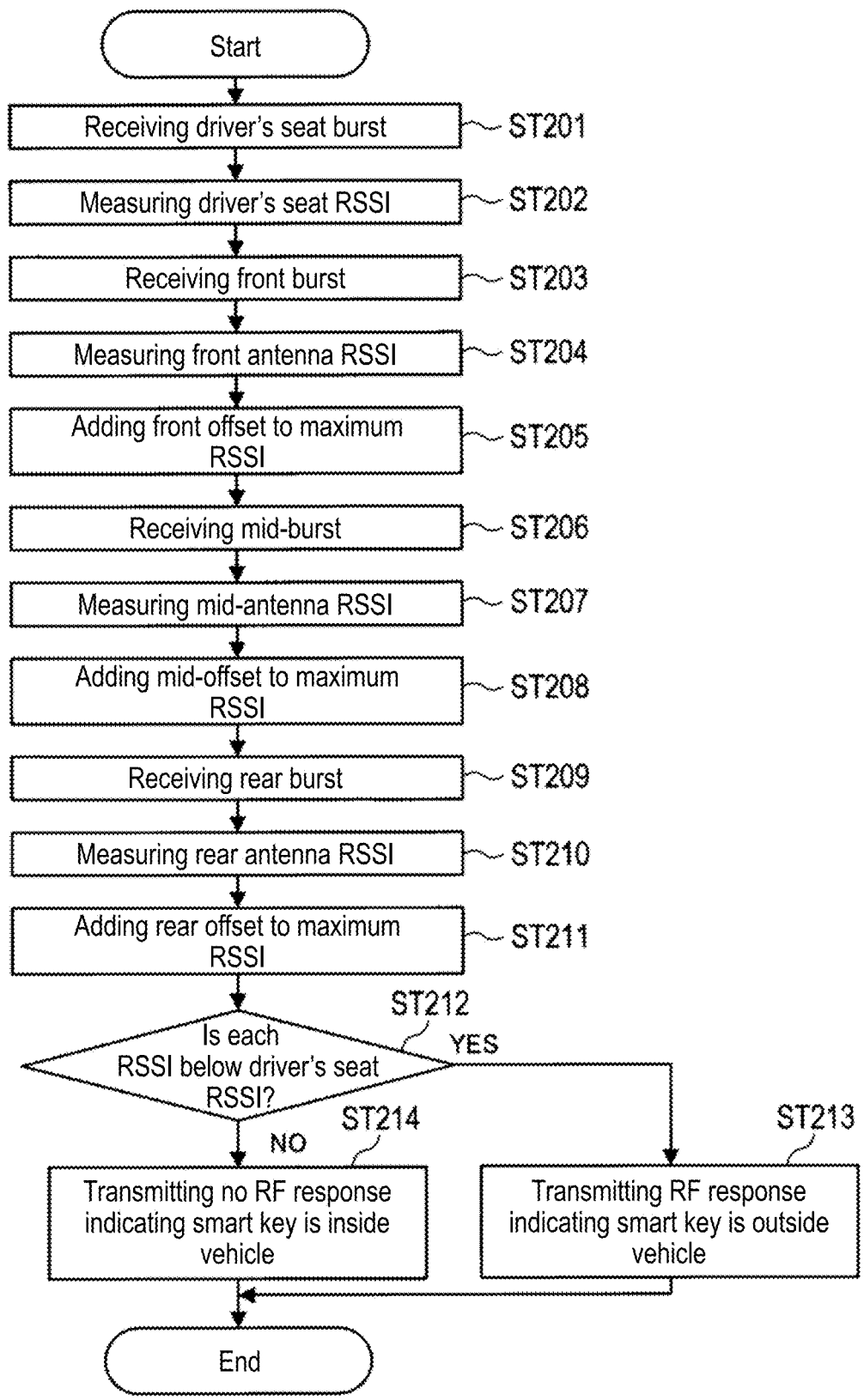
FIG. 6 is a flow chart illustrating a detailed procedure performed by a smart key-side microcomputer shown in FIG. 2.

Next, a detailed procedure performed by smart key-side microcomputer 133 shown in FIG. 2 will now be described with reference to FIG. 6.

In step ST201, smart key-side microcomputer 133 receives a driver's seat burst transmitted from driver's seat antenna 114, and, in step ST202, smart key-side microcomputer 133 measures an RSSI (driver's seat RSSI) from the received driver's seat burst.

In step ST203, smart key-side microcomputer 133 receives a front burst transmitted from front antenna 111, and, in step ST204, smart key-side microcomputer 133 measures an RSSI (front antenna RSSI) from the received front burst. In step ST205, a maximum RSSI among a plurality of the front antenna RSSIs measured in ST204 is added with a predetermined front offset to set a front RSSI.

In step ST206, smart key-side microcomputer 133 receives a mid-burst transmitted from mid-antenna 112, and, in step ST207, smart key-side microcomputer 133 measures an RSSI (mid-antenna RSSI) from the received mid-burst. In step ST208, a maximum RSSI among a plurality of the mid-antenna RSSIs measured in ST207 is added with a predetermined mid-offset to set a mid-RSSI.

In step ST209, smart key-side microcomputer 133 receives a rear burst transmitted from rear antenna 113, and, in step ST210, smart key-side microcomputer 133 measures an RSSI (rear antenna RSSI) from the received rear burst. In step ST211, a maximum RSSI among a plurality of the rear antenna RSSIs measured in ST210 is added with a predetermined rear offset to set a rear RSSI.

In step ST212, it is determined whether all of the front RSSI set in step ST205, the mid-RSSI set in step ST208, and the rear RSSI set in step ST211 are below the driver's seat RSSI measured in step ST202. When all of the RSSIs are below the driver's seat RSSI (YES), the procedure proceeds to step ST213. When all of the RSSIs are equal to or above the driver's seat RSSI (NO), the procedure proceeds to step ST214.

In step ST213, smart key-side microcomputer 133 transmits to on-board instrument 110 an RF response indicating that smart key 130 is present outside a vehicle, while, in step ST214, smart key-side microcomputer 133 does not transmit an RF response indicating that smart key 130 is present inside the vehicle. However, in step ST214, an RF response indicating that smart key 130 is present inside the vehicle may be transmitted to on-board instrument 110.

Figure 7A:
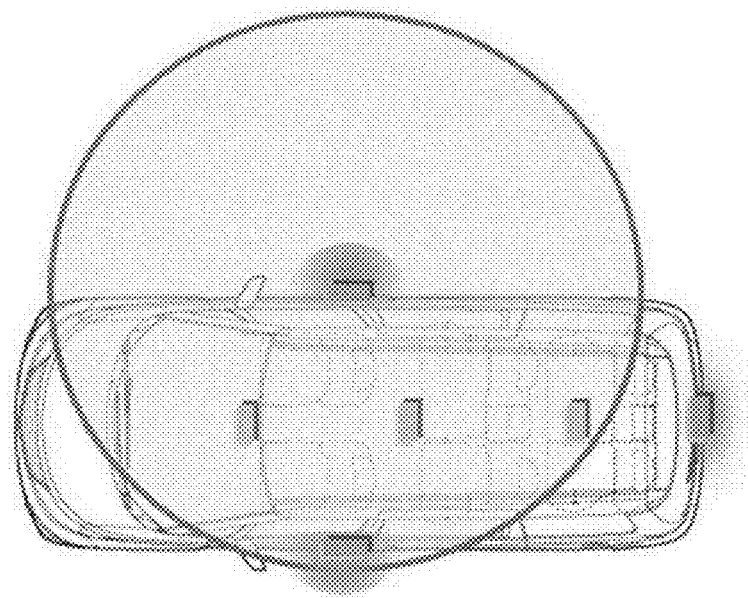
FIG. 7A is a view illustrating a case where a smart key that is not shield by a metallic object and present outside a vehicle is detected.
Figure 7B:
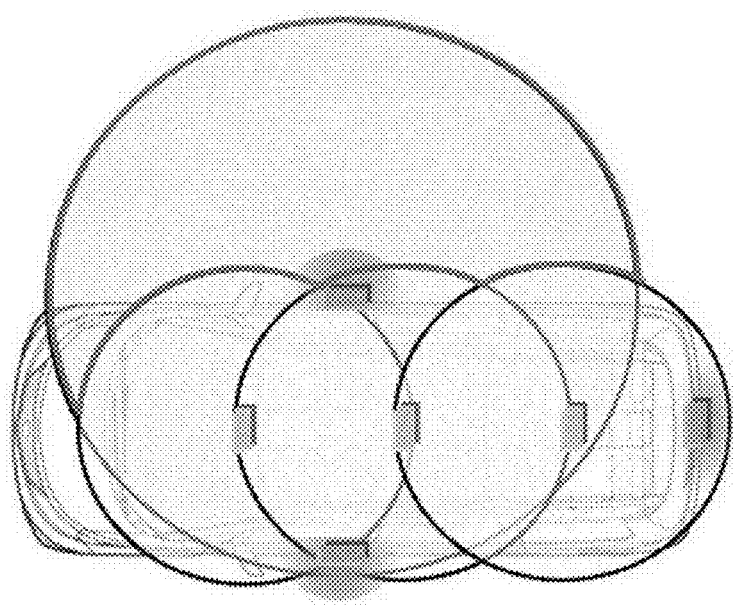
FIG. 7B is a view illustrating a case where a smart key that is not shield by a metallic object and present outside a vehicle is detected.
Figure 7C:
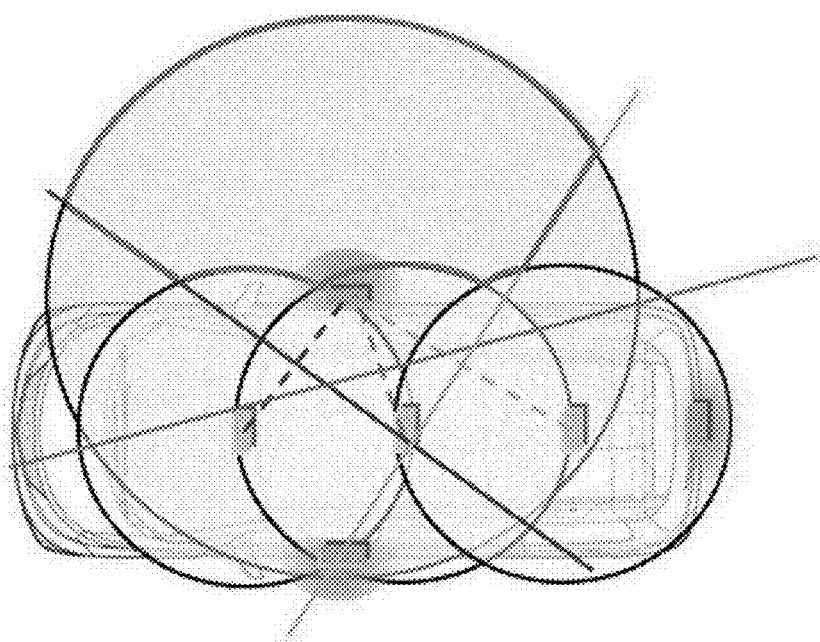
FIG. 7C is a view illustrating a case where a smart key that is not shield by a metallic object and present outside a vehicle is detected.

Next, a case where smart key 130 that is not shield by a metallic object and present outside a vehicle is detected will now be described herein with reference to FIG. 7A through FIG. 7C. FIG. 7A through FIG. 7C, show a case where transmission begins from driver's seat antenna 114.

FIG. 7A shows a range within which driver's seat antenna 114 can detect smart key 130. FIG. 7B shows a range (frame enclosed by a bold line) that is based on the detection range of driver's seat antenna 114 but detection ranges of vehicle-interior antennas are excluded.

FIG. 7C shows a range (frame enclosed by a bold line) up to which a driver's seat antenna RSSI becomes larger than a vehicle-interior antenna RSSI when sizes of the vehicle-interior antenna RSSI and the driver's seat antenna RSSI are compared.

Figure 8:
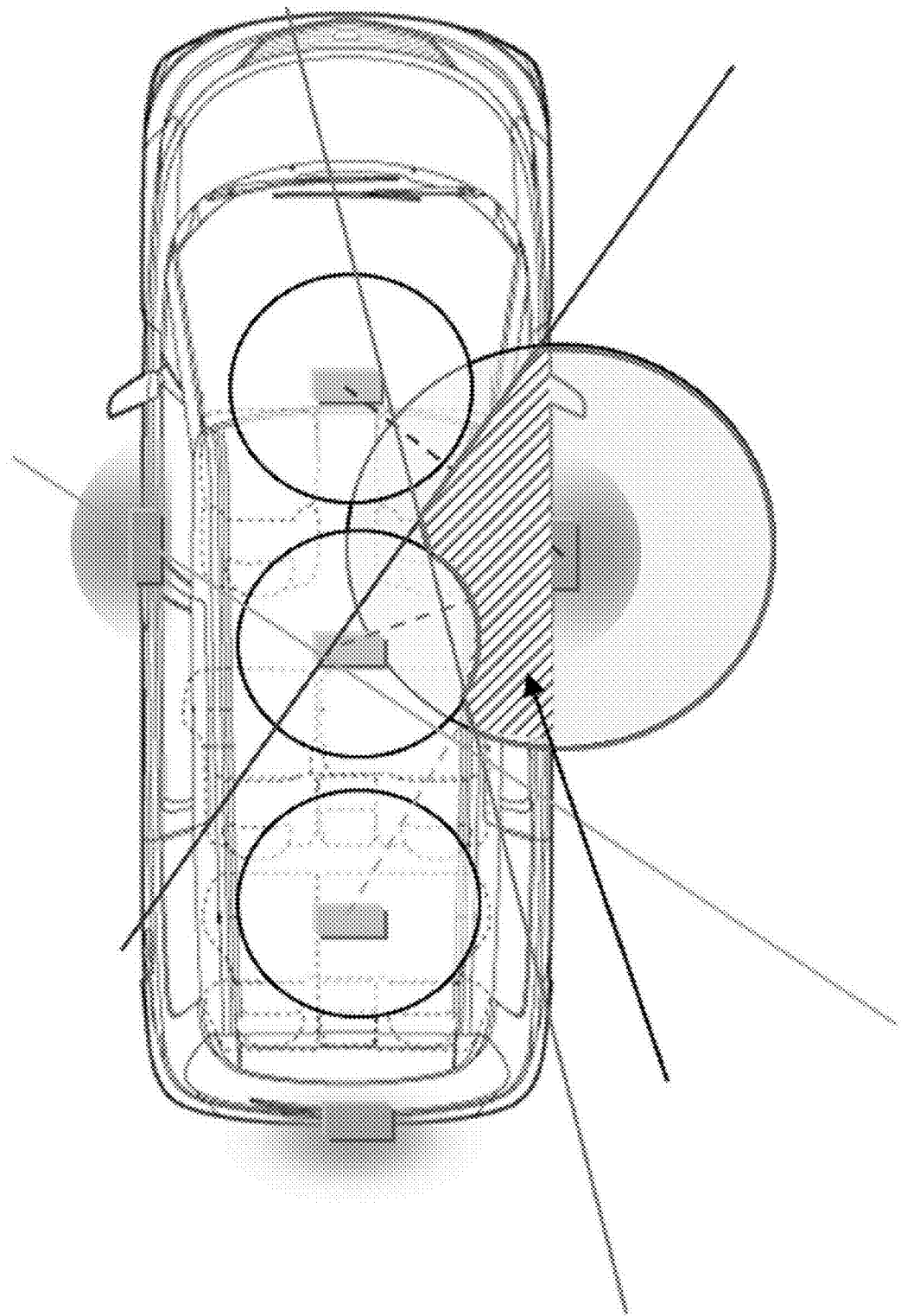
FIG. 8 is a view illustrating a case where a smart key that is shield by a metallic object and present outside a vehicle is detected.

Next, a case where smart key 130 that is shield by a metallic object and present outside a vehicle is detected will now be described herein with reference to FIG. 8. FIG. 8 shows a case where no offset is set.

In FIG. 8, smart key 130 is shield by the metallic object, and thus a detection range of each antenna is narrowed. Accordingly, an area (area indicated by oblique lines) could be created, in which a system detects that the smart key 130 is present outside the vehicle even though the smart key is present inside the vehicle. If smart key 130 is present in such an area, smart key 130 could be locked in the vehicle.

Figure 9:
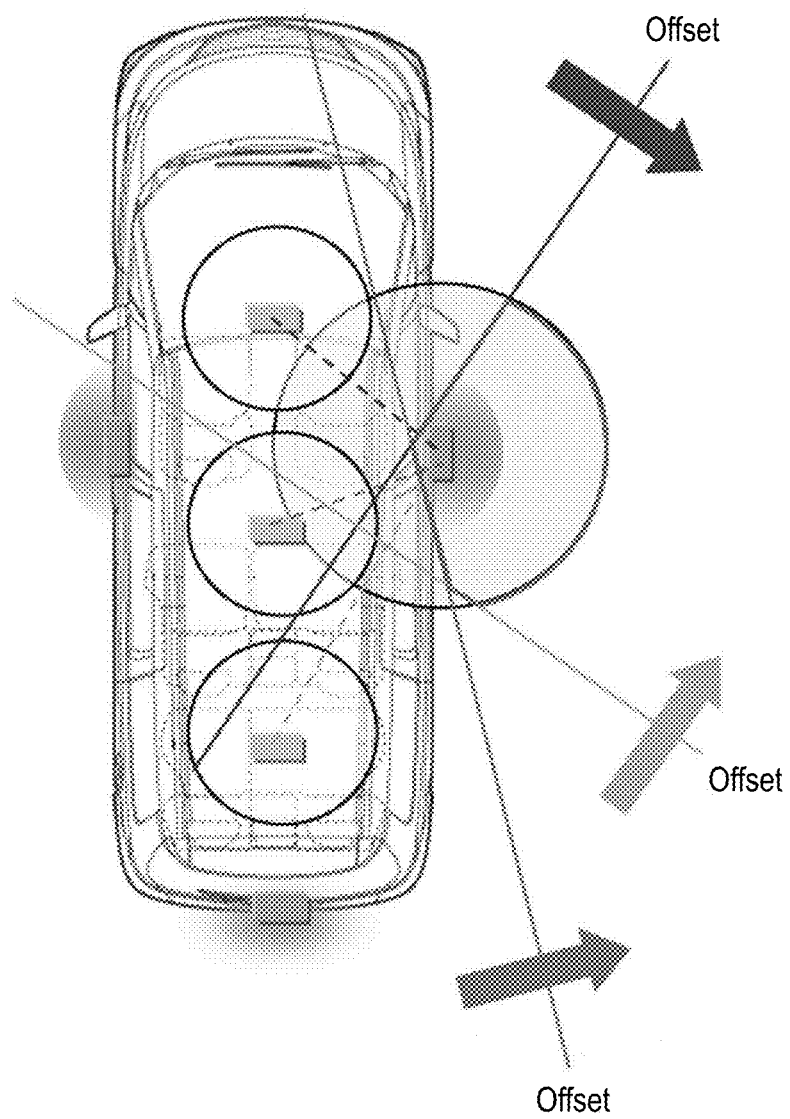
FIG. 9 is a view illustrating a case where a smart key that is present outside a vehicle is detected when an offset is provided to a vehicle-interior antenna Received Signal Strength Indicator (RSSI).

To solve this problem, an offset is provided to a vehicle-interior antenna RSSI. For this case, FIG. 9 shows a range in which a system detects that the smart key 130 is present outside a vehicle. As can be apparent from FIG. 9, an area, in which the system detects that the smart key 130 is present outside the vehicle even though the smart key is present inside the vehicle, can be eliminated. Therefore, even when smart key 130 is shield by a metallic object, a user can prevent smart key 130 from being locked in the vehicle.

According to the first exemplary embodiment as described above, by providing an offset to a vehicle-interior antenna RSSI, and comparing sizes of the vehicle-interior antenna RSSI provided with the offset with a vehicle-exterior antenna RSSI, positional detection of a smart key that is shield by a metallic object, and thus a radio wave is weakened, can be precisely performed so as to determine whether the smart key is present inside or outside a vehicle. Accordingly, a system can prevent the smart key from being erroneously detected such that the key is present outside the vehicle even though the key is present inside the vehicle, and, therefore, a user can prevent the smart key from being locked in a cabin.

Although the exemplary embodiment has described that smart key-side microcomputer 133 measures an RSSI, and adds an offset, smart key-side microcomputer 133 may measure an RSSI, and transmits the measured RSSI to on-board instrument-side microcomputer 128 so that on-board instrument-side microcomputer 128 adds an offset and performs other necessary operations.

Second Exemplary Embodiment

An increased noise from an on-board ECU, in addition to and in particular an increased noise from electronic devices such as smartphones could affect a frequency band (mainly, 100 kHz to 150 kHz) used for positional detection of a smart key, thus positional detection of the smart key could be failed. A second exemplary embodiment of the present disclosure describes how to reduce a negative effect of a noise so as to precisely detect a position of a smart key.

As a configuration of a smart entry system according to the second exemplary embodiment of the present disclosure is similar to a configuration of the first exemplary embodiment shown in FIG. 2, but only part of functions differs, so only the different functions will now be described herein with reference to FIG. 2.

Figure 10:
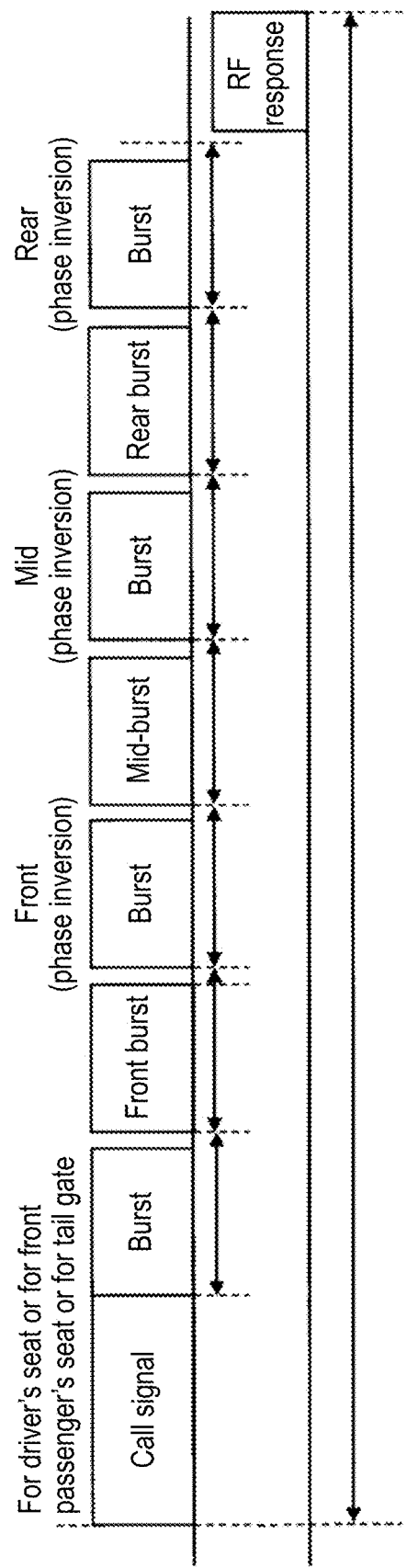
FIG. 10 is a view illustrating signals to be transmitted from each antenna, and timings of the signals.

On-board instrument-side microcomputer 128 generates a positional detection signal for detecting a position of smart key 130, and allows each antenna to transmit the signal. The positional detection signal includes a normal phase positional detection signal and a signal in which part or all of a phase of the normal phase positional detection signal is inverted 180°. FIG. 10 shows signals transmitted by on-board instrument-side microcomputer 128 from each antenna, and timings of the signals.

Smart key-side microcomputer 133 measures RSSIs from each of normal phase and reverse phase portions of positional detection signals transmitted from on-board instrument 110, and selects either of the RSSIs, whichever has a larger value. Smart key-side microcomputer 133 detects a position of smart key 130 based on the RSSI having the larger value.

Figure 11:
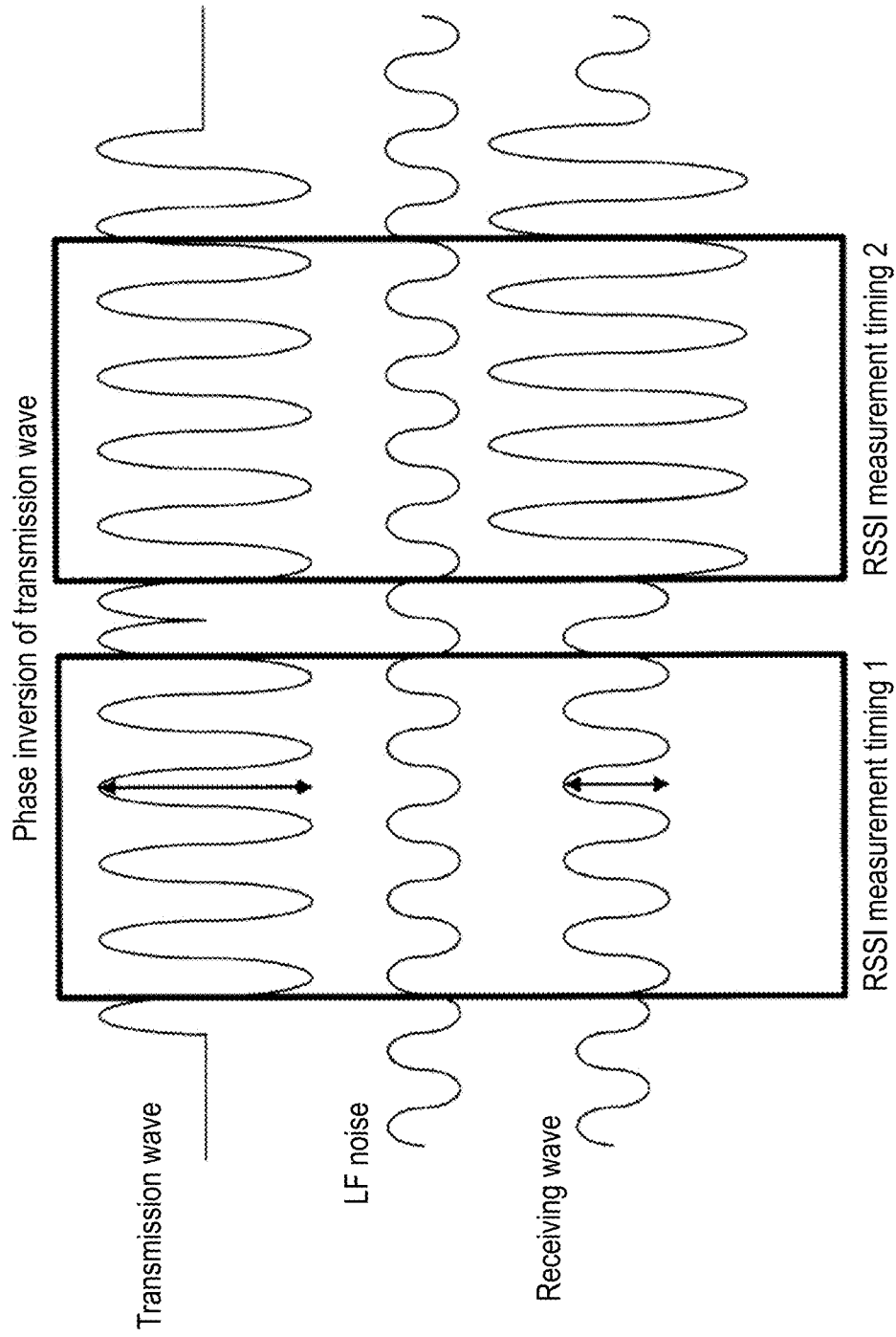
FIG. 11 is a view illustrating a process performed by a smart key-side microcomputer according to a second exemplary embodiment of the present disclosure.

FIG. 11 is a view for describing a process performed by smart key-side microcomputer 133 according to the second exemplary embodiment the present disclosure. In RSSI measurement timing 1, a normal phase positional detection signal and a noise are weakened each other, thus RSSI 1 of a received signal is reduced. In contrast, in RSSI measurement timing 2, a reverse phase positional detection signal and a noise are strengthened each other, thus RSSI 2 of the received signal is increased. As a result, RSSI 2 is selected because RSSI 2 is larger than RSSI 1.

The normal phase positional detection signal is weakened herein by the noise, while the reverse phase positional detection signal is strengthened by the noise. However, a reverse relationship could be observed.

As described above, by measuring RSSIs from both of a normal phase positional detection signal and a reverse phase positional detection signal, even though the received signals are superimposed with a noise, an RSSI of a signal can be identified that the RSSI is larger than an RSSI of another signal. By selecting the larger RSSI, with which a RF response is transmitted, positional detection of smart key 130 can be precisely performed.

According to the second exemplary embodiment as described above, by transmitting a normal phase positional detection signal and a reverse phase positional detection signal from an on-board instrument, measuring RSSIs from both of the normal phase positional detection signal and the reverse phase positional detection signal each received by a smart key, and selecting a larger RSSI to detect a position of the smart key, the position of the smart key can be precisely detected, while a negative effect of a noise can be reduced. Therefore, a user can prevent the smart key from being locked in a cabin.

Although the exemplary embodiment has described that part of a positional detection signal is inverted 180°, the present invention is not limited to this value, but a phase may be shifted in a range from 90° to 180° inclusive.

In addition, although the exemplary embodiment has described that RSSIs are measured from each of a normal phase positional detection signal and a reverse phase positional detection signal, and a larger RSSI is selected, the present invention is not limited to this measurement and selection, but, for example, two measured RSSIs may be averaged, and, based on an averaged RSSI, an RF response may be transmitted.

The exemplary embodiments have been described above.

In addition, although the present disclosure has been described with separate embodiments, i.e. the first exemplary embodiment and the second exemplary embodiment, as shown above, the first exemplary embodiment and the second exemplary embodiment may be implemented simultaneously to achieve the present disclosure.

In addition, in the above exemplary embodiments, a term "smart key" is used to refer to a portable device for a description purpose, the term "smart key" may be called by another name, such as FOB key, electronic key, hand-held key, or badge.

INDUSTRIAL APPLICABILITY

The present disclosure is useful in precisely detecting a position of a smart key.

REFERENCE MARKS IN THE DRAWINGS

100: smart entry system (vehicular near field communication system)
110: on-board instrument
111: front antenna
112: mid-antenna
113: rear antenna
114: driver's seat antenna
115: front passenger's seat antenna
116: tail gate antenna
117: RF receiving antenna
121-126: transmitter
127: RF receiver
128: on-board instrument-side microcomputer
130: smart key (portable device)
131: receiving antenna
132: receiver
133: smart key-side microcomputer
134: RF transmitter
135: RF transmitting antenna

The invention claimed is:

1. A vehicular near field communication system comprising:
    an on-board instrument having a vehicle-exterior antenna and a vehicle-interior antenna, the on-board instrument being mounted in a vehicle; and
    a portable device performing radio communications with the on-board instrument,
    the portable device comprising
        receiver for receiving a first signal transmitted from the vehicle-exterior antenna and a second signal transmitted from the vehicle-interior antenna, measure for measuring a first received signal strength from the first signal and a second received signal strength from the second signal, offset adder for adding an offset to the second received signal strength, and transmitter for transmitting a response signal to the on-board instrument in accordance with the first received signal strength and the second received signal strength added with the offset.

2. The vehicular near field communication system according to claim 1, wherein the transmitter selects either the first received signal strength or the second received signal strength added with the offset, whichever is larger, and transmits the response signal in accordance with the selected, received signal strength.

3. The vehicular near field communication system according to claim 1, wherein the on-board instrument transmits from each of the antennas a normal phase signal and a signal having a phase shifted from a phase of the normal phase signal, the measure of the portable device measures a third received signal strength from the received normal phase signal and a fourth received signal strength from the signal having the shifted phase, and the transmitter of the portable device transmits the response signal in accordance with the third received signal strength and the fourth received signal strength.

4. The vehicular near field communication system according to claim 3, wherein the on-board instrument transmits a signal having a phase shifted approximately 180° from the phase of the normal phase signal.

5. The vehicular near field communication system according to claim 3, wherein the transmitter of the portable device selects either the third received signal strength or the fourth received signal strength, whichever is larger, and transmits the response signal in accordance with the selected, received signal strength.

6. The vehicular near field communication system according to claim 3, wherein the transmitter of the portable device averages the third received signal strength and the fourth received signal strength, and transmits the response signal in accordance with the averaged, received signal strength.

7. A portable device comprising:

receiver for receiving a first signal and a second signal respectively transmitted from a vehicle-exterior antenna and a vehicle-interior antenna included in an on-board instrument mounted in a vehicle;

measure for measuring a first received signal strength from the first signal and a second received signal strength from the second signal;

offset adder for adding an offset to the second received signal strength; and transmitter for transmitting a response signal to the on-board instrument in accordance with the first received signal strength and the second received signal strength added with the offset.

8. An on-board instrument comprising:

a vehicle-exterior antenna;

a vehicle-interior antenna;

transmitter for transmitting to a portable device a first signal and a second signal respectively from the vehicle-exterior antenna and the vehicle-interior antenna;

receiver for receiving from the portable device a first received signal strength of the first signal and a second received signal strength of the second signal each measured by the portable device;

offset adder for adding an offset to the second received signal strength; and detector for detecting a position of the portable device based on the first received signal strength and the second received signal strength added with the offset.

* * * * *